No. 11,744. Reissued May 30, 1899.
C. B. SHAW.
AUTOMATIC SPRINKLER FOR FIRE EXTINGUISHERS.
(Application filed Feb. 17, 1899.)
Fig. I.
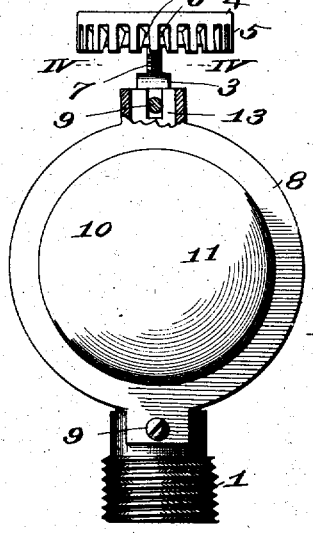
Fig. II.
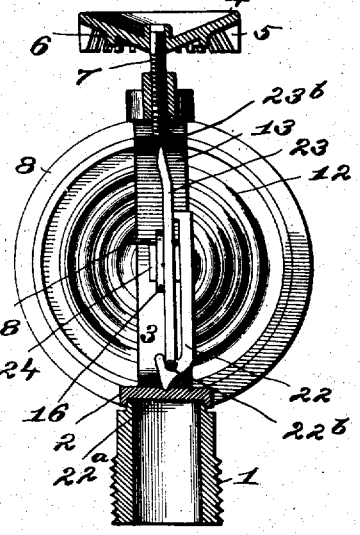
Fig. III.
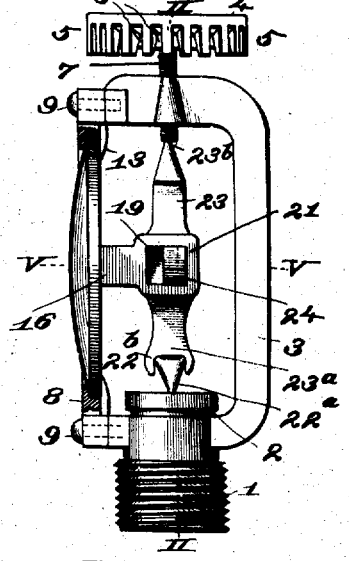
Fig. IV.
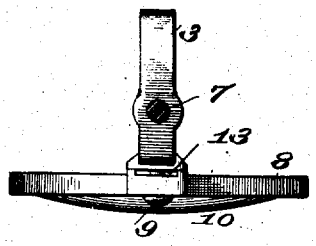
Fig. VI.
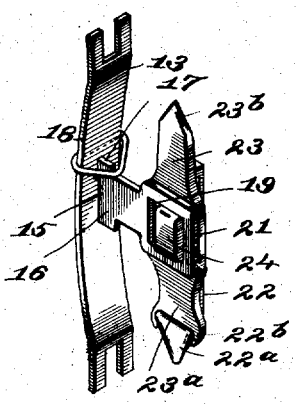
Fig. V.
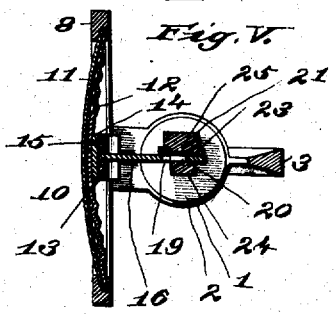
Fig. VII.
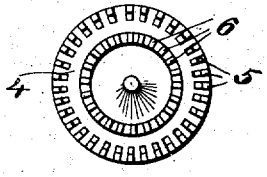
Fig. VIII.
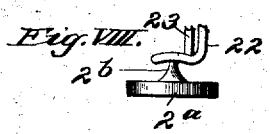
Fig. X.
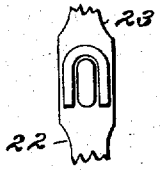
Fig. IX.
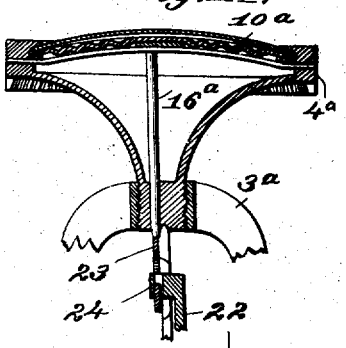
Witnesses
G. A. Paulbeschmidt.
E. S. Knight
Inventor
Campbell B. Shaw
By Wright Brothers
Attorneys

UNITED STATES PATENT OFFICE.

CAMPBELL B. SHAW, OF KIRKWOOD, MISSOURI.

AUTOMATIC SPRINKLER FOR FIRE-EXTINGUISHERS.

SPECIFICATION forming part of Reissued Letters Patent No. 11,744, dated May 30, 1899.

Original No. 594,971, dated December 7, 1897. Application for reissue filed February 17, 1899. Serial No. 705,760.

*To all whom it may concern:*

Be it known that I, CAMPBELL B. SHAW, a citizen of the United States, residing at Kirkwood, St. Louis county, State of Missouri, have invented certain new and useful Improvements in Automatic Sprinklers for Fire-Extinguishers, of which the following is a full, clear, and exact description, reference being had to the accompanying drawings, forming part of this specification.

My invention relates to an automatic sprinkler operated by the flexing of the flexible wall of a thermostatic chamber; and my invention consists in features of novelty hereinafter fully described, and pointed out in the claims.

Referring to the drawings, Figure I is a rear elevation, partly in section. Fig. II illustrates a section taken on line II II, Fig. III. Fig. III is a side elevation with the thermostatic disk-holding ring in section. Fig. IV is a top or end view, with the adjustable spray-disk removed, on line IV IV, Fig. I. Fig. V illustrates a cross-section taken on line V V, Fig. III. Fig. VI is a perspective of the valve-retaining strut and its locking device. Fig. VII is an inner face view of the spray-disk. Fig. VIII is a detail view of a modified construction of the valve-seating end of the strut. Fig. IX is a sectional view of a modified arrangement of the thermostat and its connection with the strut. Fig. X is a detail view illustrative of the employment of a fusible substance forming the connection between the two sections of the strut.

In the drawings, 1 designates a nipple on which the sprinkler is carried. These nipples are attached to the water-supply pipe at suitable distances apart. 2 designates the valve that closes the orifice of said nipple. 3 designates a frame carried by said nipple 1, the outer end of said frame being curved to extend across the orifice of the nipple, but remote therefrom.

4 designates a spray-disk mounted on a screw-threaded stem 7, that fits in a threaded bore in the outer curved end of the frame 3. The spray-disk 4 is provided on its inner face with an outer circle of teeth 5 and an inner circle of teeth 6, the teeth of one circle being offset from the other for the purpose of producing a more efficient spray.

8 designates a flanged ring attached to the nipple 1 and to the outer end of the frame 3 by means of screws 9. In this ring is seated a thermostatic chamber 10, provided with an outer inflexible wall 11 and an inner flexible wall 12. This chamber is designed to contain any highly-expansible fluid, such as alcohol or ether, which when heated will expand within the chamber and cause the wall 12 to flex.

13 designates a flat spring provided with forked ends that straddle the screws 9, connecting the ring 8 to the nipple 1 and frame 3. This spring is loosely seated between the ring and the nipple and frame for the purpose of allowing it to play endwise when the flexible wall of the thermostatic chamber presses its central portion outward in flexing. Between the walls 12 and spring 13 is a disk 14, that forms a central bearing for the spring. In the central portion of the spring 13 is a slot 15, arranged to receive one end of a key 16. One or more shoulders 17 are formed on this key. A loop 18, that spans the spring 13, engages the key through means of the shoulder, the purpose of which will hereinafter appear in the reference to the operation of the device. The outer end of the key 16 contains an opening 19, into which a tongue 20 projects.

21 designates a sectional strut composed of a valve-contacting member 22 and an interlocking member 23. The member 22 is provided with a point $22^a$, that engages in a recess in the outer face of the valve 2, and the main body of said member is offset from its point and contains a groove $22^b$, that receives the pronged end $23^a$ of the member 23. The opposite end of the member 23 is provided with a point $23^b$, that engages in a recess of the inner end of the spray-disk stem 7. The two members of the strut 21 lie side by side and are normally connected by the following means: The member 23 is provided with an opening that receives a protuberance 24 on the member 22, in which is an opening 25, that receives the tongue 20 of the key 19, thereby firmly locking the members together until such time as the flexible wall 12 of the thermostatic chamber 10 has been flexed under the action of heat upon the expansible fluid within said chamber.

The operation of the sprinkler is as follows: When the parts of the device have been placed together in the manner described, the strut members, being locked together, hold the valve 2 firmly to its seat on tightening the screw-stem 7 of the spray-disk against the outer end of the member 23. The parts normally remain in their set positions; but in the event of a fire in the vicinity of the sprinkler the heat causes the expansive fluid in the thermostatic chamber to expand, flexing the wall 12 of said chamber and forcing the spring 13 outward. The wall and spring in their movement carry the key 16 with them, in which action the tongue 20 is carried out of engagement in the opening 25 in the protuberance 24 on the strut member 22. The releasing of the tongue 20 permits the members of the strut to fall apart under the action of the pressure of the water pressing the valve 2 from its seat. The seat of the inner end of the member 23 on the member 22 being offset from the central line of the strut, the movement of the valve-contacting point $22^a$ of the member 22 is on the unseating of the valve tripped to impart a swiveling action to the said member 22, and the two members of the strut are thus more readily separated than would be the case were the seating end of the outer member of the strut seated in central line with relation to the end bearings of the strut. On the separation of the strut 21 the key 16 remains in the slot 15 of the plate 13; but the water in escaping from the nipple 1, striking the key, throws it out of the slot in order to prevent its interference with the free distribution of the water. To cause the key to be more readily thrown from its seat, the loop 18 is employed, which loop forms a hinge or swivel at one edge of the key, on which the key turns when struck by the water.

In Fig. VIII, I have shown a modified construction of the valve $2^a$ and the strut. In this construction the outer face of the valve is provided with a point $2^b$, and the valve-contacting member 22 is formed to rest upon this point instead of its being provided with a point to rest in a recess of the valve.

In Fig. IX, I have shown another modification in which the thermostatic chamber is located above the spray-disk, and the key $16^a$ extends inward and connects with the strut in substantially the same manner as in the main form.

In Fig. X, I have illustrated the application of a solder or other fusible joint between the strut members for the purpose of showing that the strut might be connected in this manner and be separated on the fusing of the solder, thereby releasing the valve, instead of employing a thermostatic chamber having a flexible wall through means of which the members of the strut are held and released.

I claim as my invention—

1. In an automatic sprinkler, the combination of a valve, a sectional strut arranged to hold said valve to its seat, a thermostatic chamber provided with a flexible wall, and a connection between said flexible wall and strut, through means of which the members of said strut are locked together and released by the flexing of said wall in thermostatic action, substantially as set forth.

2. In an automatic sprinkler, the combination of a valve, a sectional strut arranged to hold said valve to its seat, a spray-disk, a screw-stem carried by said disk and arranged to engage the outer end of said strut, a thermostatic chamber provided with a flexible wall, and a connection between said flexible wall and strut, through means of which the members of said strut are locked together and released by the flexing of said wall in thermostatic action, substantially as set forth.

3. In an automatic sprinkler, the combination of a valve, a sectional strut arranged to hold said valve to its seat, a thermostatic chamber provided with a flexible wall, and a key arranged to lock the members of said strut together, said key being so disposed as to be acted upon in the flexing of said wall whereby it is released from said strut, substantially as set forth.

4. In an automatic sprinkler, the combination of a valve, a sectional strut arranged to hold said valve to its seat, a thermostatic chamber provided with a flexible wall, a spring seated against said wall, a key forming a connection between said wall and said strut arranged to lock the members of said strut together, and a loop carried by said spring arranged to engage the edge of said key, substantially as set forth.

CAMPBELL B. SHAW.

In presence of—
E. S. KNIGHT,
STANLEY STONER.